Sept. 4, 1962      J. N. BOYLE      3,052,062
LIMB ROOTING DEVICE
Filed Jan. 23, 1961
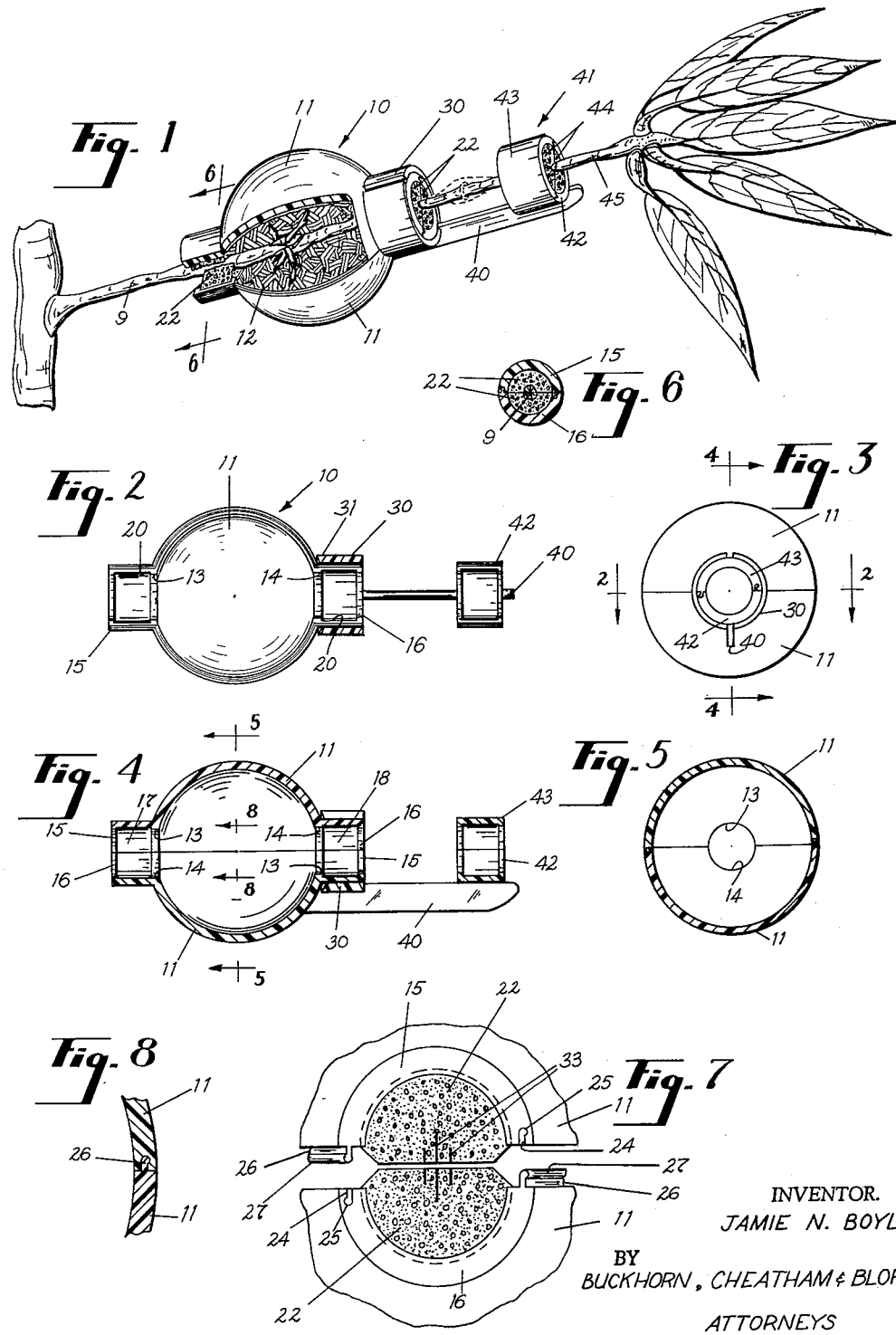
INVENTOR.
JAMIE N. BOYLE
BY
BUCKHORN, CHEATHAM & BLORE
ATTORNEYS United States Patent Office 3,052,062
Patented Sept. 4, 1962

3,052,062
LIMB ROOTING DEVICE
Jamie N. Boyle, 815 SW. Viewmont Drive,
Portland, Oreg.
Filed Jan. 23, 1961, Ser. No. 84,376
11 Claims. (Cl. 47—37)

The present invention relates to an improved limb rooting device adapted to create plants by causing rooting to occur on a living branch of a plant. The present invention is an improvement upon such prior art devices as are disclosed in the patents to May 1,655,731, January 10, 1928, and Eaton et al. 2,786,306, March 26, 1957.

A principal object of the present invention is to provide means of the character described whereby the percentage of failures is materially reduced, use of the improved means resulting in the formation of roots in a high percentage of cases, and whereby the destruction of previously formed roots by loss of water or overheating is materially reduced.

A further object of the present invention is to provide means of the foregoing character which is easily formed of readily available materials and which may be assembled in useful relation to a growing twig by unskilled labor.

A further object of the present invention is to provide means of the foregoing character in combination with means for permitting the grafting of a desired scion onto the branch or twig being rooted at the same time that rooting is being induced. The object of the invention in this respect is to provide means whereby grafted, rooted plants may be created in a short time. In this aspect of the present invention a great advantage accrues as distinguished from prior art methods in which it was necessary first to create rooted twigs, sever the twigs from the parent stock and plant them, allow a long period of time to elapse while the plants become established in firmly rooted condition, and then graft a scion to the root stock thus created. By the use of my invention grafted, growing, layered plants may be created in a few weeks, as compared to the many months required by the prior procedure.

A further object of the present invention is to provide means of the foregoing character in which it is a simple matter to inspect and ascertain the condition of rooting of the twig which is being layered.

A further object of the present invention is to provide means of the foregoing character in which it is possible to inject nutrients or other material into the layering device without disturbing the roots being formed.

A further object of the present invention is to provide a device of the foregoing character which automatically compensates for changes in internal pressure due to temperature changes, without permitting the escape of moisture from the interior thereof.

The principles involved in capsule layering of plants are fairly well developed, and reference may be made to the above-identified patents, particularly the latter patent to Eaton et al., for details of rooting mediums, nutrient formulas and the like which are not repeated herein.

The objects and advantages of the present invention may be more readily understood by reference to the accompanying drawings taken in connection with the following specification wherein a preferred form of the invention is illustrated and described and wherein like numerals are used on like parts throughout.

In the drawings;
FIG. 1 is a view in perspective, partially broken away, of the present invention in use for creating a rooted and grafted plant from a living branch;

FIG. 2 is a horizontal section taken through the present device substantially along line 2—2 of FIG. 3;
FIG. 3 is an end view of the present device taken from the right end of FIG. 2.
FIG. 4 is a vertical section taken substantially along line 4—4 of FIG. 3;
FIG. 5 is a vertical section taken substantially along line 5—5 of FIG. 4;
FIG. 6 is a vertical section taken substantially along line 6—6 of FIG. 1;
FIG. 7 is a partial end view on an enlarged scale of parts of the device in separated condition; and
FIG. 8 is a partial vertical section on an enlarged scale taken substantially along line 8—8 of FIG. 4.

The present invention comprises a capsule 10 which is adapted to be mounted upon a twig 9 which has been nicked or scarred in the portion thereof to be surrounded by the capsule. The capsule is formed of a pair of, preferably identical, concave members indicated at 11, and may have a spherical form as illustrated, or an elongated form which may be more desirable for certain varieties of plants. The capsule is adapted to hold a filling 12 of a moistened rooting medium such as earth, Sphagnum moss, expanded vermiculite, exploded perlite and the like. The moistening is preferably accomplished by means of a nutrient solution such as detailed in the above-identified Eaton et al. patent, and may contain a root growth promoting hormone or the like.

Each of the members 11 is provided with a pair of notches, preferably semi-circular, the notches being designated at 13 at one end and at 14 at the other end, the notches of the pair of members when positioned together creating an opposed pair of openings through which a twig may enter and leave the capsule, the twig thereby having a portion of its length imbedded in the rooting medium 12. If the twig has had a notch or scar or the like created in this portion of its length it is likely that roots will be formed as illustrated in FIG. 1.

Each of the concave members is provided with an axially extending flange in circumferential relation to the notches 13 and 14, the flanges being identified respectively as flanges 15 and 16. Therefore when the two members are assembled to form the capsule, a pair of sleeves, defining a pair of axially aligned passages 17 and 18, are formed as prolongations of the openings 13 and 14 so that the twig may be coaxially disposed therein. Each of the flanges is provided with a wide, shallow circumferential interior groove 20 for firmly retaining the peripheral edges of a pair of air and water impervious, resiliently compressible gasket members 22. The peripheral surface of each of the gasket members preferably conforms to the groove 20 whereby the gasket members are held from displacement due to changes in pressure during use of the device. Preferably the gasket members are cemented to the concave members so that they will not become displaced during handling.

The concave members are preferably formed of an air and moisture impervious, translucent plastic such as polyethylene or cellulose acetate or cellulose butyrate. Any good quality transparent or translucent injection molding material may be employed, but it is preferable to employ a material of such character that the material may be deformed slightly and spring back into shape. This is particularly for the reason that the longitudinal edges of the two concave members are preferably so formed as to interlock. Preferably each concave member is provided along one longitudinal edge with a narrow groove 24 having a slight enlargement 25 at its inner extremity, and the opposite edge is provided with a narrow rib 26 terminating in a slightly enlarged bead 27. Thus when the two halves of the capsule are aligned with each in reversed relation, the bead on each will snap into the groove in each adjacent edge to interlock the parts together in sealed relationship to each other as illustrated in FIG. 8. Other forms of edge construction may be utilized, and if the material thereof does not lend itself to the snap construction just described the two halves may be held in assembled relation to each other by suitable means such as a split ring 30 adapted to slip over one of the axial extensions provided by the flanges 15 and 16, or a pair of such snap rings may be used, one at each end of the capsule. Such a ring may be formed of any suitable plastic material such as the same plastic material employed for the concave members, and is preferably provided with a chamfered inner end 31 to enable it to be slipped into position, expanding slightly as it does so, so as to permit the larger external diameter of the extension to be accommodated within the smaller internal diameter of the split ring.

The gasket members 22 are formed of any suitable resiliently compressible material impervious to air and water, preferably being formed of cellular material such as open cell polyurethane plastic. Each gasket member 22, when in normal, expanded state, is preferably of a greater cross sectional area than the cross sectional area of the flange within which it is confined, the gasket member preferably having a portion of its mass protruding beyond the confines of the flange. Preferably each gasket member is provided with a plurality of longitudinally extending slits 33 in the central area of its exposed surface, the slits facilitating conformation of the gasket to the irregularities of surface of the portion of the twig embraced thereby. The gaskets thus hermetically seal the interior of the capsule, and being resilient, permit expansion and contraction of air trapped within the interior of the capsule to accommodate for changes in pressure due to temperature changes of the atmosphere. The moisture is thus prevented from escaping other than by travelling through the twig and being released as water vapor through the leaf stomata. The slits 33 facilitate the insertion of a hypodermic needle associated with a syringe for the purpose of injecting water, solutions of nutrients, hormones or other materials which may be desirable. In this fashion the portion of the twig from which the roots are sprouting may be kept under constant conditions as to pressure, temperature and the like without sudden shock such as would be occasioned by opening up the capsule. The longitudinal edges of the gasket members 22 are inwardly chamfered as most clearly illustrated in FIG. 7 so that compression of the gasket members when the two concave members are fitted together will not cause edgewise extrusion to prevent edgewise interfitting of the concave members.

It is to be appreciated that the device as so far described comprises a complete and fully operative rooting capsule which may be made in various sizes so as to accommodate twigs or branches of various diameters. The material of which the concave members are formed may be transparent or translucent. Certain unyielding plastics may be used which would be completely translucent but would not permit interlocking of the edges which is preferred. Those plastics which will yield to permit interlocking of the longitudinal edges are usually cloudy or milky, and may be tinted green or brown without harmful effects. A deep brown or black is to be avoided since the internal temperature thereby induced would be excessive, probably burning the fine rootlets. One of the concave members 11 may be tinted more than the other, in such case the deeply tinted member being utilized as the lower of the two. This would cause a greater retention of ground reflected heat by the lower member so as to tend to equalize temperatures throughout, and would still permit examination of root growth through the lightly tinted upper member without disturbing the capsule.

In the event that it is desired to create grafted, rooted plants the capsule 10 is used with a split ring 30 having attached thereto a longitudinally extending splint including a bar 40 fixed to the snap ring and projecting forwardly parallel to the twig, and a split sleeve 41 supported at the free end of the bar. The split sleeve 41 preferably comprises a lower half sleeve section 42 and an upper half sleeve section 43 having longitudinally interlocking edges as previously described with respect to the concave members 11. A pair of gasket members 44, similar to the gasket members 22 previously described, may be clamped between the half sleeve sections 42 and 43 whereby firmly to embrace a scion 45 grafted to the end of the twig 9 as indicated in the space between the snap ring 30 and the snap ring assembly 41 in FIG. 1. It will be appreciated that terminal grafting of small twigs as herein illustrated is a delicate operation and that the present device permits such an operation to be carried out. All that is necessary is for the operator to form the graft while a snap ring carrying the half-sleeve 42 is in position on the previously positioned capsule, rest the scion on the lower gasket 44 held in the lower section 42, and snap the upper section 43 into position. The scion is thus firmly maintained against wind or other disturbances. Growth of the terminal of the scion will of course be readily apparent, and when it is observed that rootlets are being formed in the capsule 10 the twig 9 may be severed and the propagated plant planted where desired.

The use of the capsule is of further advantage since the severed plant may remain unplanted for some time after severance without damage, particularly if the severed ends of the twigs 9 are immersed in water, nutrient solution or moist earth. When the planting area is prepared the capsule is easily opened without disturbance of any of the plant structure and the plant may be planted without it being adversely affected by the transition. The parts of the device may be salvaged by washing, and sterilizing if thought desirable, and reused. However, it will be readily apparent that the device should be so inexpensively fabricated that it might be more economical to discard used capsules. A further advantage of the device is that grafted and rooted, or merely layered cuttings, may be shipped, or placed on display for delayed sales to retail purchasers, by utilizing the capsule as a shipping or display container. In such case the severed projecting end of the twig may be dipped in a sealant.

Having illustrated and described a preferred embodiment of the invention it should be apparent to those skilled in the art that the same permits of modifications in detail and arrangement. I claim as my invention all such modifications as come within the true spirit and scope of the following claims.

I claim:

1. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material.

2. A plant propagating device comprising an air and moisture impervious capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and a plurality of gasket members confined in each of said sleeves, said gasket members being formed of air and water impervious, resiliently compressible material, the combined cross-sectional area of the gasket members, in their normal expanded state, being greater than the interior cross-sectional area of the sleeves in which they are confined whereby said gasket members are compressed into sealing engagement with a twig passing through the capsule, and a split snap ring clamp encircling at least one of said sleeves.

3. A plant propagating device comprising an air and moisture impervious capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having continuous longitudinal edges throughout which intersect said openings, said members each comprising a pair of axially extending flanges defining portions of a pair of sleeves respectively defining prolongations of said openings, and a plurality of gasket members confined in each of said sleeves, said gasket members being formed of air and water impervious, resiliently compressible material, the combined cross-sectional area of the gasket members confined in each of said sleeves being greater, when in their normal expanded state, than the interior cross-sectional area of the sleeves in which they are confined whereby said gasket members are compressed into sealing engagement with a twig passing through the capsule, a separable clamp encircling one of said sleeves, a splint member extending longitudinally from said clamp, and means mounted on the free end of said splint member for resiliently holding a scion grafted onto said twig.

4. The construction set forth in claim 2 wherein said means comprise a pair of complementary sleeve-forming members having interfitting longitudinal edges, and a pair of resiliently deformable members clamped within said pair of sleeve-forming members and adapted to be compressed against said scion.

5. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, and said concave members being formed of resiliently deformable material with the longitudinal edges thereof comprising interlocking bead and groove means for effecting sealing engagement of said edges with each other.

6. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, and said gasket means comprising a plurality of gasket members respectively mounted in said flanges.

7. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, and the longitudinal edges of said gasket members being chamfered so that portions thereof will not be extruded between the longitudinal edges of said concave members upon assembly of said device upon a twig.

8. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, each of said gasket means comprising a pair of gasket members each provided with a plurality of longitudinal slits extending from end to end of the portions thereof engaging said twig.

9. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, said concave members being identical and each being provided with a groove on one longitudinal edge and a bead on its other longitudinal edge, said grooves and beads being adapted for interlocking engagement when the pair of members are brought together in relatively reversed relation to each other.

10. A plant propagating device comprising an air and moisture impervious, partially translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, said concave members being identical in configuration and one of said members being translucent and the other of said members being opaque.

11. A plant propagating device comprising an air and moisture impervious, translucent capsule adapted to be filled with a moistened rooting medium and having an opposed pair of openings through which a twig to be rooted may enter and leave the capsule, the twig thereby having a portion of its length embedded in said rooting medium, said capsule comprising a separable pair of concave members, said members having longitudinal edges which intersect said openings, said members each comprising a pair of axially extending flanges defining portions of a pair of sleeves respectively defining prolongations of said openings, and gasket means confined in each of said sleeves, said gasket means being formed of air and water impervious, resiliently compressible material, the combined cross-sectional area of said gasket means confined in each of said sleeves being greater, when in normal, expanded state, than the interior cross-sectional area of the sleeves in which they are confined whereby said gasket means are compressed into sealing engagement with a twig passing through the capsule.

References Cited in the file of this patent

UNITED STATES PATENTS

| | | |
|---|---|---|
| 473,836 | Goodacre | Apr. 26, 1892 |
| 1,708,292 | Buys | Apr. 9, 1929 |
| 2,849,590 | Stiebel | Aug. 26, 1958 |
| 2,939,248 | Beck | June 7, 1960 |